July 8, 1930.　　　　J. S. REID　　　　1,769,964

SHOCK ABSORBER

Filed Nov. 21, 1927

Inventor

James S. Reid

By Brockett & Hyde

Attorneys

Patented July 8, 1930

1,769,964

UNITED STATES PATENT OFFICE

JAMES S. REID, OF CLEVELAND, OHIO, ASSIGNOR TO THE NEWELL-THOMPSON COMPANY, OF CLEVELAND, OHIO, A CORPORATION OF OHIO

SHOCK ABSORBER

Application filed November 21, 1927. Serial No. 234,745.

This invention relates to rebound checking devices or so-called shock absorbers such as are employed in connection with the springs of automotive vehicles for the purpose of preventing excessive rebound thereof.

More particularly this invention pertains to that type of such devices wherein a fluid contained chamber is employed, a portion of the chamber being divided off from the remainder, the portion being variable dependent upon the motions of the spring to be affected, valve means being provided for the purpose of controlling fluid passage between the chamber portions to effect the desired result.

It is old and well known in the art to employ in such device a double acting piston arrangement comprising a piston movable in a fluid containing cylinder, provision being made for fluid flow from one end of the cylinder to the other past the piston; the piston being reciprocated in the cylinder dependent on relative movement of the vehicle frame and the vehicle wheel supporting the same the spring to be controlled. Such a piston and cylinder arrangement however, is necessarily of considerable bulk and weight and is rather expensive of manufacture.

An object of my invention is to do away with reciprocating parts, substituting therefor a novel arrangement of relatively rotatable parts having the same capacity for work but occupying considerably less space.

Another object of the invention is to provide an arrangement of relatively few and simple parts whereby the same will function as efficiently as would reciprocating parts, and which will be much less expensive to manufacture; and such object includes particularly the provision of novel bypass control means.

Figure 1:
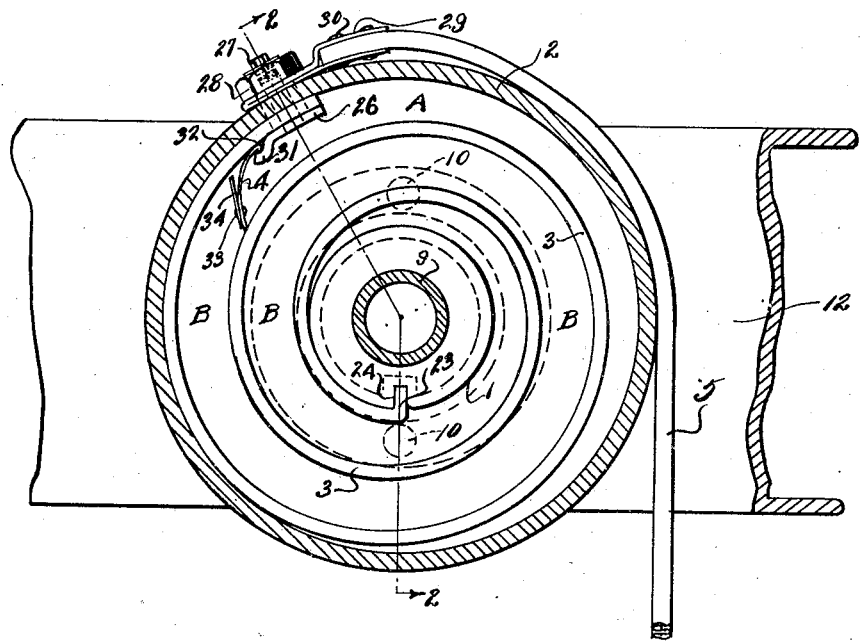
Figure 2:
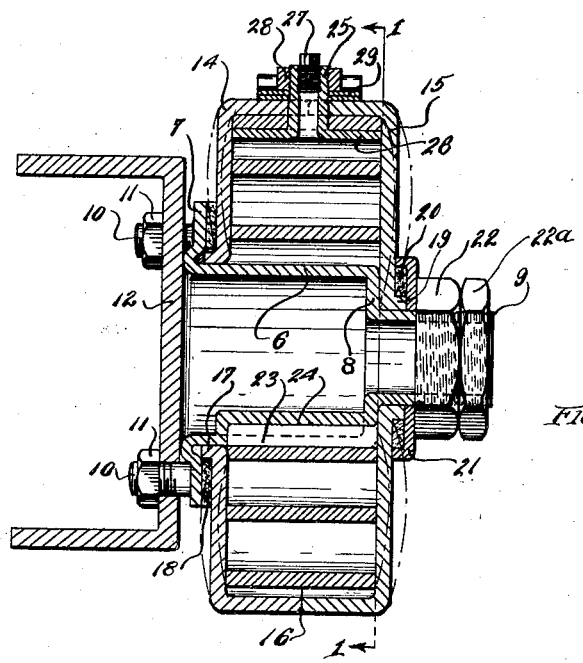

Further objects and advantages together with the exact nature of my invention will be apparent from the following description taken in connection with the accompanying drawings, in which Fig. 1 is an elevation of an example of my invention, parts being broken away to show details of construction, pertinent adjacent parts of a vehicle to which the invention is applied also appearing, the showing of the parts being as in stable relation, that is, as before distortion of the spring and therefore before the rebound thereof which is to be controlled; Fig. 2 is a transverse sectional view of the device taken as in the planes of line 2—2, Fig. 1, and indicating in dot-dash lines the flexure of the casing end walls by which a bypass is provided.

The principal parts of the device are a spindle 1, a casing 2, a spring 3, a valve 4 and means such as the strap 5.

The spindle 1 is preferably drawn from sheet metal having a hollow cylindrical portion 6 flanged as at 7 and shouldered as at 8, terminating with the neck portion 9 threaded along the outer portion of its length. Secured upon the flange 7 as by welding are a pair of stud bolts 10 by which the spindle may be secured with a channel 12 which forms one of the longitudinal members of the frame of an automotive vehicle. The spindle is preferably provided between the flange and the cylinder portion 6 with a bead portion 13 adapted to bear against the web of the channel 12 on tightening of the bolts 11.

Rotatably mounted upon the spindle is the casing 2 which is cylindrical and formed of a pair of pressed metal members 14 and 15 sealed at their adjoining edges as by the peripheral welding 16. The smaller circumferential edge of the casing member 14 is turned outward of the casing as at 17 to fit about the cylindrical portion 6 of the spindle and have a bearing surface thereon. Between the flange 7 of the spindle and the member 14 is a gasket 18. The smaller peripheral edge of the member 15 is similarly turned outwards as at 19 to bear upon the neck portion 9 of the spindle; and the cylindrical portions of the casing members 14 and 15 are of dimension such that the member 15 may have bearing against the shoulder 8 of the spindle.

Seating about the axial opening of the member 15 is a gasket 20 protected by a washer cap 21 which in turn is secured by a nut 22 and lock nut 22ᵃ turned upon the threads of the spindle neck portion 9.

The casing is thus rotatably secured upon the spindle and forms therewith an annular enclosure sealed by the gaskets described.

Within this enclosure is coiled the volute spring 3 closely fitting between the end walls of the casing to form a spiral chamber. The inner end of the spring is bent as at 23 and engaged in a notch 24 formed in the spindle. The outer end of the spring is secured within the casing by the bolt 25. The bolt 25 is preferably drawn from sheet metal, having a head portion 26 extending across inside the casing, and the opposite end of the shank portion of the bolt, which is tubular, is threaded inside and outside. A plug 27 is turned into the inner threads of the bolt and a nut 28 is turned upon the outer threads of the bolt to secure the same and thus the outer end of the spring 3 in the position indicated. Underlying the bolt 28, however, and engaged against the outer periphery of the casing thereby is a ferrule 29, with which is secured as by rivets 30 an end of the strap 5. The opposite end of the strap is secured in any convenient manner with the vehicle axle adjacent the spring by which the frame is supported upon the axle. It will be understood that the spindle 1 is so located upon the channel 12 of the vehicle frame that the stretch of the strap 5 which is tangent to the casing 2, will be substantially vertical.

One of the transverse edges of the bolt head 26 is provided with a curved transverse lip 31 along and within the curve of which seats the turned under edge 32 of the valve 4. The valve 4 is rectangular in outline and fits closely between the end walls of the casing whereby a portion "A" of the spiral chamber referred to is spaced off from the remainder portion "B" thereof. It will be understood that the cooperating portions 31 and 32 of the bolt head 26 and valve 4 respectively form a hinge about which the valve may freely swing. Secured with the free end of the valve however, as by the rivet 33 is a spring 34 which serves to yieldably limit the maximum valve opening and tends to maintain the free end of the valve substantially in seated positions against the spring as indicated in the drawing.

In operation the casing is completely filled, as through the opening closed by the plug 27, with a liquid such as oil or glycerin. As already mentioned the showing of the drawings is of the parts in their relative position with the particular vehicle spring which is to be controlled by the device in stable condition, as when the vehicle of which the channel 13 is a part, is stationary. Under these conditions the spring 3 is under some tension, urging the casing 2 to rotate upon the spindle 1 in counter-clockwise direction, Fig. 1, and thus maintaining the strap 5 taut, as indicated. It will be understood of course that the strength of the spring 3 is insignificant as compared with that of the vehicle spring to be controlled, so that the action of the vehicle spring is not affected by that of the spring 3 per se.

Supposing now that the vehicle spring is instantaneously greatly compressed and the compressing force as suddenly removed, as when the vehicle, under way, passes over an obstruction in the roadway.

During the compression of the vehicle spring the channel 12 will be lowered with respect to the axle to which the end (not shown) of the strap 5 is connected. During such movement of the channel the spring 3 will be allowed to rotate the casing in a counter clockwise direction on its spindle, maintaining the strap 5 taut.

As the casing thus moves, the inner end of the spring 3 being secured from rotation, the spring will somewhat expand or "unwind" so that the outer convolutions thereof will move radially outwardly with respect to the casing periphery. Such spring movement will result in contraction of the volume of the chamber portion "A"; and a corresponding expansion of the remainder portion "B"; and liquid will therefore flow freely past the valve 4 in counter clockwise direction.

During expansion or recoil of the vehicle spring the channel 12 will be forced upwards of the vehicle axle and the strap 5 will thus be subject in tension to the full strength of the vehicle spring. Such pull on the strap will of course tend to rotate the casing in a clockwise direction upon its spindle. As the casing is thus urged in a clockwise direction, the tendency due to the spring 3 is to expand the chamber portion "A" and contract the remaining portion "B". At this time the valve 4 however, tightly seats against the spring 3, preventing such flow thereby, and would therefore prevent upward or rebound motion of the channel 12 of the vehicle were not some means of bypassing the valve provided.

According to my invention the end walls of the casing, which it will be recalled have been pressed from sheet metal, at this time are bulged outwardly by the built up fluid pressure in the chamber portion "B", as indicated by the dot dash lines Fig. 2, sufficiently to allow a portion of the liquid within the casing the flow to the chamber portion "A" from the chamber portion "B" around and radially of the convolutions of the spring 3 therebetween. It will be understood that the curvature of the dot-dash lines greatly exaggerates the deflection of the end walls of the casing, the actual bulge being very much less than that indicated in Fig. 2. It will also be clear that the rebound checking effect of the device will depend upon the bypass flow allowed. This flow where the described bypass means is employed is regulated by the nuts 22 which may be adjusted against the end wall of the casing member 15, whereby a perfect control of the checking action of the device is obtainable throughout the range of desired adjustment.

Attention is directed to the location of the bolt 25. Should the casing liquid be depleted as by leakage, new liquid may be added by removing the plug 27 and if necessary jacking up the channel 12 sufficiently to bring the bolt to the extreme upper position, that is, rotating the casing until the bolt axis is vertical.

What I claim is:

1. In a rebound checking device, a spindle, a cylindrical casing rotatably mounted thereon and forming therewith an annular enclosure adapted to contain a liquid, a volute spring within said enclosure and closely fitting between the end walls of the casing to form a spiral chamber and having its ends secured with said spindle and with said casing respectively, means associated with one of said enclosure-forming parts and arranged to space off a portion of said chamber from the remainder thereof, whereby the relative volumes of said chamber portions will vary with relative movement of the spindle and casing, to prevent flow of liquid into said chamber portion, valve means associated with said spacing-off means to allow flow thereby in one direction only, and means for bypassing said valve means to control said relative movement in one direction.

2. In a rebound checking device, a spindle, a cylindrical casing rotatably mounted thereon, and forming therewith an annular enclosure adapted to contain a liquid, a volute spring within said enclosure and closely fitting the end walls of the casing to form a spiral chamber and having its ends secured with said spindle and with said casing respectively, valve means hinged with said casing and adapted to seat against said spring to space off a portion of said chamber from the remainder thereof, and means for bypassing said valve means to control said relative movement.

3. In a rebound checking device, a spindle, a cylindrical casing rotatably mounted thereon and forming therewith an annular enclosure adapted to contain a liquid, a volute spring within said enclosure and closely fitting the end walls of the casing to form a spiral chamber and having its ends secured with said spindle and with said casing respectively, and valve means hinged with said casing and adapted to seat against said spring to space off a portion of said chamber from the remainder thereof, the end walls of said casing being adapted to be flexed outwardly by said liquid to allow the same to bypass said valve means.

4. In a rebound checking device, a spindle, a cylindrical casing rotatably mounted thereon, and forming therewith an annular enclosure adapted to contain a liquid, a volute spring within said enclosure and closely fitting the end walls of the casing to form a spiral chamber and having its ends secured with said spindle and with said casing respectively, valve means arranged to space off a portion of said chamber from the remainder thereof to prevent flow from said remainder portion into said chamber portion, the end walls of said casing being adapted to be flexed outwardly by said liquid to allow the same to bypass said valve means, and means for adjustably controlling the flexure of said walls.

5. In a rebound checking device, a spindle adapted to be secured on a vehicle frame, a cylindrical casing rotatably mounted thereon and forming therewith an annular enclosure adapted to contain a liquid, a volute spring within said enclosure and closely fitting the end walls of the casing to form a spiral chamber and having its ends secured with said spindle and with said casing respectively, valve means arranged to space off a portion of said chamber from the remainder thereof to prevent flow of liquid from said remainder portion into said chamber portion and whereby the relative volumes of said portion and remainder will vary with relative movement of the spindle and casing, means for controlling flow of said liquid past said valve means, and means having connection with said casing and adapted for connection with the vehicle axle to rotate said casing on said spindle dependent upon relative movement of said frame and axle.

6. In a rebound checking device, a casing having walls providing a liquid-tight chamber, a member fitting across said chamber and having an edge portion movable along a wall portion of said casing, said wall portion being adapted to yield outwardly upon movement of said member, to allow flow of liquid past said edge portion thereof.

In testimony whereof I hereby affix my signature.

JAMES S. REID.